United States Patent [19]
Nakatani

[11] Patent Number: 5,365,293
[45] Date of Patent: Nov. 15, 1994

[54] PANHEAD OF IMPROVED OPERABILITY

[75] Inventor: Koichiro Nakatani, Tokyo, Japan

[73] Assignee: Velbon International Corporation, Torrance, Calif.

[21] Appl. No.: 34,226

[22] Filed: Mar. 17, 1993

[51] Int. Cl.⁵ .............................................. G03B 29/00
[52] U.S. Cl. .................................................... 354/81
[58] Field of Search ................................. 354/80, 81

[56] References Cited

U.S. PATENT DOCUMENTS

| | | | |
|---|---|---|---|
| 4,736,217 | 4/1988 | McDowell | 354/81 |
| 4,767,090 | 8/1988 | Hartman et al. | 354/81 |
| 4,959,671 | 9/1990 | Ishikawa | 354/81 |
| 5,081,478 | 1/1992 | Hayashida et al. | 354/81 |
| 5,170,197 | 12/1992 | Schmidt et al. | 354/81 |
| 5,267,712 | 12/1993 | Shen | 354/293 |

Primary Examiner—Michael L. Gellner
Assistant Examiner—Nicholas J. Tuccillo
Attorney, Agent, or Firm—Beehler & Pavitt

[57] ABSTRACT

A panhead for a tripod has a panning base for rotation about a vertical axis, a tilting base hinged to the panning base for tilting in a vertical plane, a handle attached to the tilting base, and a camera mounting hinged to the tilting base for turning a camera between a landscape and a portrait position, the hinge of the camera mounting being situated so that the camera viewfinder remains on the right hand side of the panhead handle in either the portrait or landscape positions of the camera and the photographer is not forced to change grips on the handle between these positions.

8 Claims, 3 Drawing Sheets

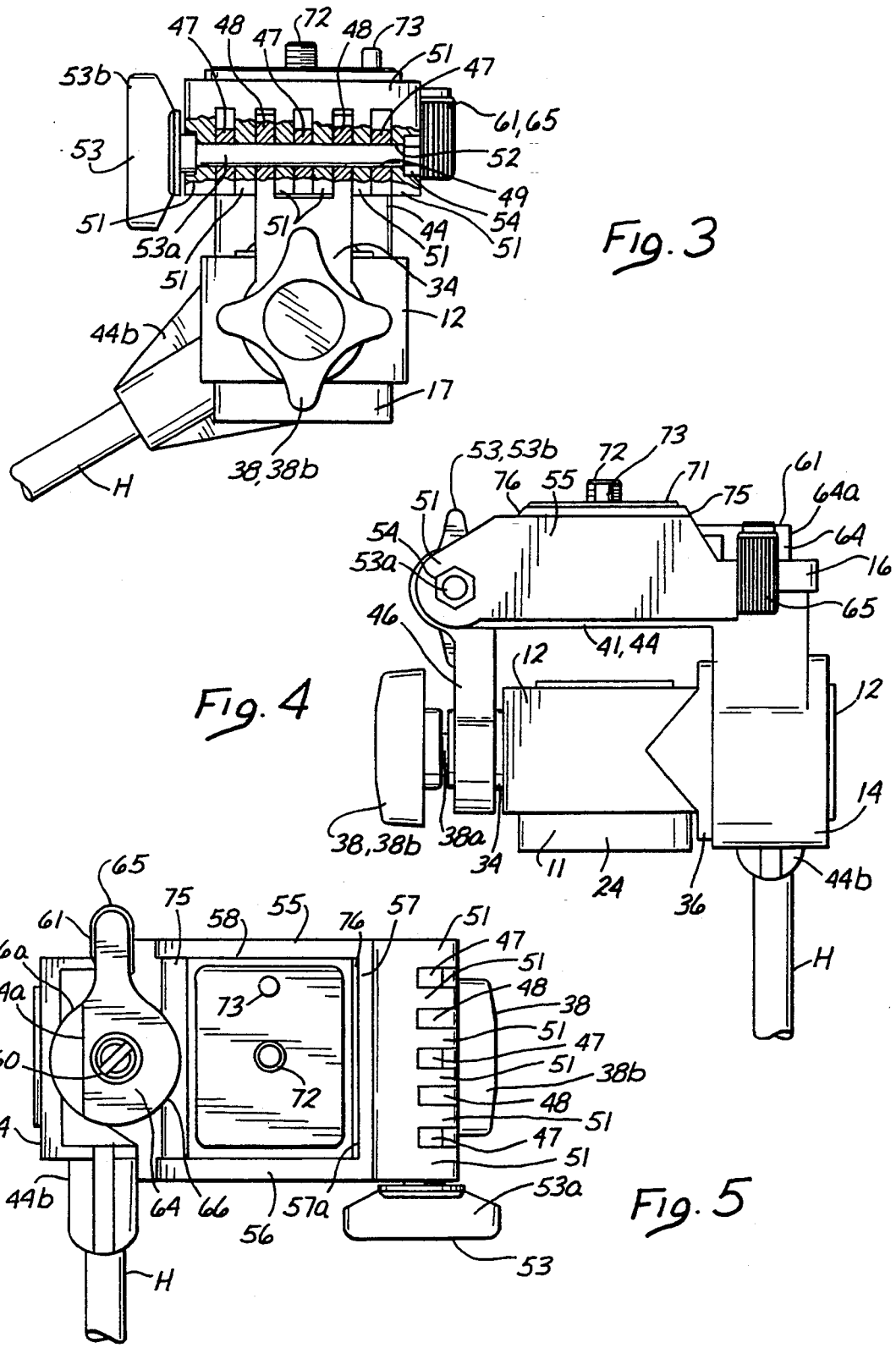

PANHEAD OF IMPROVED OPERABILITY

BACKGROUND OF THE INVENTION

1. Field of the Invention

The present invention relates to panheads of the type used with collapsible tripods such as used for supporting photographic and video cameras.

2. Background of the Invention

Existing panheads which support a camera or the like on a tripod consist of 1) a panning base which turns about a vertical axis, 2) a tilting base which can tilt about a first horizontal axis for up/down movement and 3) a side tilting base which can turn about a second horizontal axis transverse to the first horizontal axis for right/left movement. The side tilting base is the base on which the camera or the like is mounted. In this conventional type of panhead, the panning handle which turns the panning base, etc., extends rearwardly from the panhead on the operator's left side of the panhead, and the axis second horizontal of the side tilting base also lies on the left side of the tilting base. When positioning the camera vertically, for example, when the side tilting base is tilted from its horizontal position to an upright position by turning it counter-clockwise with respect to the operator, the camera mounted on the base becomes positioned further to the left of the panning handle. The problem with this condition is that the operation of the panhead becomes cramped and restricted because the operator must now work the panning handle with the right hand while at the same time operating the camera with the left hand.

A need exists for panheads which do not suffer from this shortcoming when the side tilting base is turned to its vertical position.

SUMMARY OF THE INVENTION

The improved panhead of this invention is of the type on which an object, typically a camera, can be mounted such that it can be rotated freely horizontally, and has an operating handle installed on the left rear of the panhead, as well as a side tilting base which is installed on the panhead in such a way as to be axially supported on the right side of the panhead, so that it can tilt sideways, and is adapted to serve as the base for the object to be mounted.

Since the operating handle is installed on the left rear side of the unit, while the side tilting base turns on an axis on the right side of the panhead, the operating handle of the novel panhead is always positioned to the left of the mounted object, even when the side tilting base is turned from its horizontal position to a vertical position while the object is mounted on the side tilting base.

BRIEF DESCRIPTION OF THE DRAWINGS

FIG. 3 is a partially broken away right side view of the panhead of FIG. 1;

FIG. 4 is a front view of the panhead of FIG. 1;

FIG. 5 is a top plan view of the side tilting base of the panhead of the FIG. 1;

DETAILED DESCRIPTION OF THE PREFERRED EMBODIMENTS

Figure 1:
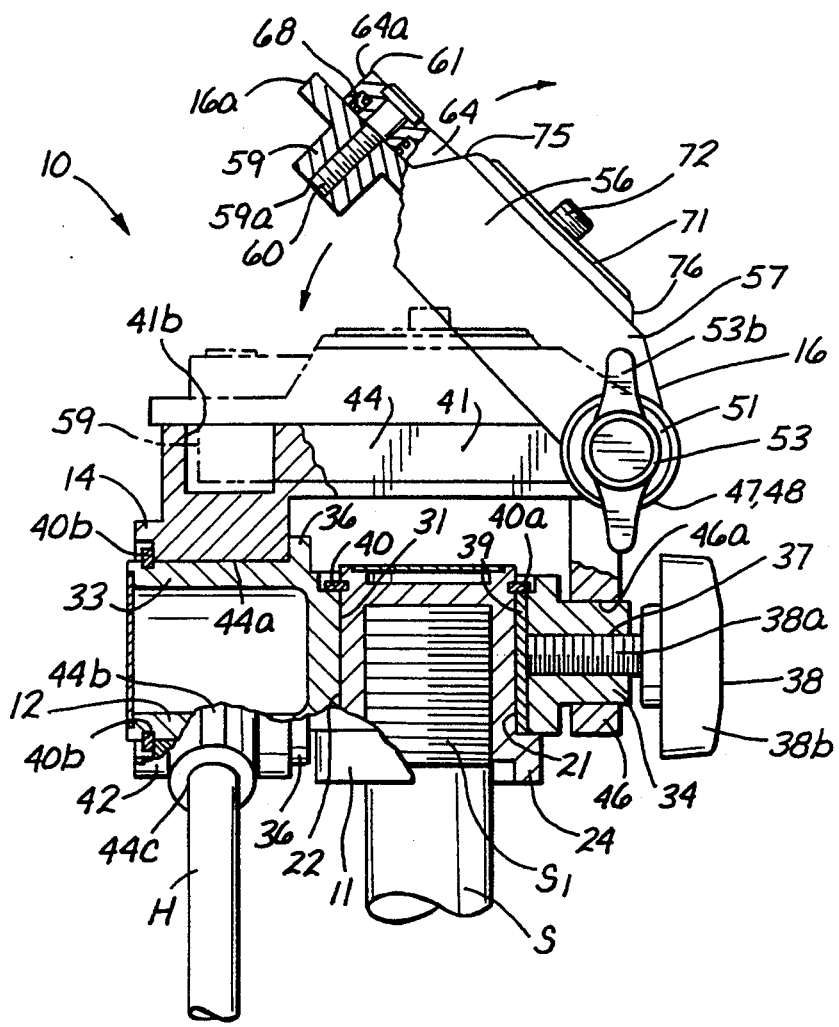
FIG. 1 is a rear partially broken away view of a first embodiment of the improved panhead.
Figure 2:
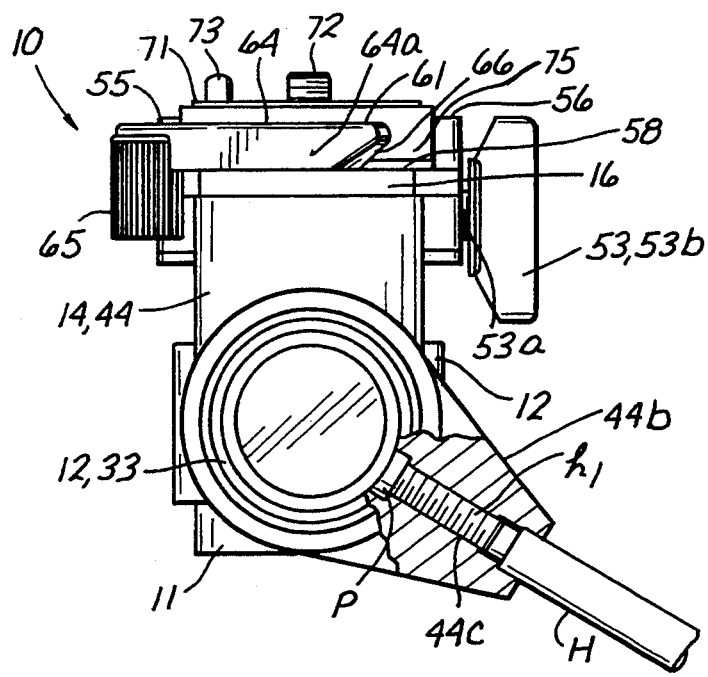
FIG. 2 is a partially broken away left side view of the panhead of FIG. 1.

With reference to the drawings, FIGS. 1 through 5, a first embodiment of the improved panhead is generally designated by the numeral 10, and includes a base unit 11, which receives the attachment screw S1 of, e.g., a tripod S; a panning base 12 supported on the base unit 11 so as to allow the panning base to turn freely about a vertical axis; a tilting base 14 supported on the panning base 12 so as to allow the tilting base to tilt about a first horizontal axis extending from side to side relative to an operator of the panhead; and a side tilting base 16, supported on the tilting base 14 so that the tilting base 16 may tilt about a second horizontal axis extending from front to back relative to the operator. The base unit 11 is generally cylindrical and has a threaded bore 21 formed in its underside and along its axial center, for admitting an attachment screw S1 of a tripod S. The base unit 11 includes a vertical cylindrical portion 22 which fits into the panning base 12, and a flange 24 of enlarged diameter formed at the lower end of the cylindrical portion 22.

The panning base 12, is of elongated shape extends lengthwise from left to right in FIG. 1 and has a vertical through-hole 31 in its center, within which the cylindrical portion 22 of the base unit turns freely, allowing the panning base 12 to rotate freely in a horizontal plane on the base 11. On either side of the through-hole 31 of the panning base 12, two generally cylindrical horizontal shaft sections 33 and 34 are formed coaxially to each other. The horizontal shaft section 33 to the left of the operator has a somewhat larger diameter than the shaft section 34 on the right, and a flange 36 formed near the through-hole 31 on the shaft section 33 has a still larger diameter. A screw hole 37 extends from left to right in the axial center of the horizontal shaft section 34 on the right side of the panning base 12, and a threaded portion 38a of pan locking screw 38 screws into the screw hole 37. The tip of the threaded portion 38a bears against the cylindrical portion 22 of the base unit 11 through a pressure plate 39, such that by turning the handle 38b of the pan locking screw 38, the panning base 12 can either be locked against rotation relative to base 11 or its resistance to rotation can be varied. A retaining ring 40a is pressed into a groove near the upper end of the through-hole 31 in the panning base 11 to keep the base unit 11 from separating from the panning base 12.

A tilting base 14 consists, first, of the tilt base proper 44 which is a generally L-shaped part as seen in cross section in FIG. 1, and which in turn consists of an upper plate 41 and a left side plate 42 which hangs downwardly from the left side of the upper plate 41, and secondly, a right side plate 46 whose upper part is connected to the right side of the upper plate 41. The horizontal shaft portion 33 on the left side of the panning base 12 is fitted to turn freely in a hole 44a formed in the left side plate 42 of the tilt base proper 44, while the horizontal shaft portion 34 on the right side of the panning base 12 is inserted to turn freely in a hole 46a formed in the right side plate 46 on the right side of the panning base 12, such that the tilting base 14 can turn in a vertical plane about the horizontal shaft portions 33 and 34 which together define a first horizontal axis of the panhead.

A handle support 44b is formed rearwardly and downwardly from the left side plate 42 of the tilt base proper 44. A screw hole 44c which opens into the hole 44a extends along the center axis of the handle support 44b. A threaded portion h1 of the rod-like panning handle H is screwed into the hole 44c, and the end of the threaded section h1 presses against the horizontal shaft section 33 of the panning base 12 via a pressure plate P. By manually operating the panning handle H, the panning base 12 and the tilting base 14 can be freely turned, while by means of a grip (not shown in the drawing) the operating handle H can be tightened or loosened against the shaft section 33, the tilting base 14 can be locked in position or held with varying resistance to movement.

A recess 41b is formed on the left side of the upper plate section 41 and a retaining ring 40b is pressed into a groove in the shaft section 33 at the left end of the hole 44a of the tilt base proper 44 for retaining the base 44 on the shaft section 33.

Cylindrical bearings 47 and 48, best seen in FIGS. 3 and 5, are formed on the right side of the top plate 41 and the top end section of the right side plate 46, respectively, of the tilting base 14. These bearings 47 and 48 are each divided into multiple elements along a longitudinal axis extending from front to back of the panhead, like the teeth of a comb, and are made to mesh with each other in the gaps between adjacent elements of the bearings. A through-hole 49 extends from front to back axially through the bearings.

Side tilting base 16 is a generally rectangular plate as best seen in FIG. 5, and has a cylindrical bearing 51 extending along a longitudinal axis on the right side of the base 16. Bearing 51 is divided along its axis by slots into multiple elements, as the teeth of a comb, and the bearings 47 and 48 of the tilting base 14 are designed to mesh into these slots between elements of the bearing 51 and to turn freely against each other. A through-hole 52 passes from front to back through the elements constituting the cylindrical bearing 51 and is aligned with the through-hole 49 of bearings 47, 48 of the tilting base 14, and the side tilting base 16 is hinged to the tilting base 14 by side tilt locking screw 53 which passes through the aligned through-holes 49 and 52 and defines a second horizontal axis of the panhead. A nut 54 which is locked against rotation in a recess formed in the end of bearing 51 of the side tilting base 16 is threaded onto the end of the screw thread 53a of the side tilt locking screw 53, allowing the bearings 47, 48 of the tilting base 16 to be locked against rotation with the bearing 51 of the side tilting base 15, or to introduce an adjustable resistance between the bearings 47, 48 and 51 by adjusting the knob 53b of the side tilt locking screw 53.

As will be apparent from FIGS. 1 and 5, the bearing elements 47 and 48 do not turn relative to each other but are held together by screw 53 to join the upper end of right side plate 46 to the right side of the top plate 41. The bearing elements 51 are free to turn about screw 53 relative to the bearing elements 47 and 48, so as to allow the side tilting base 16 to swing through an arc suggested by the arrows from a horizontal position suggested in phantom lining in FIG. 1 towards an upright on vertical position.

Three ridge sections including a front ridge 55, a rear ridge 56 and a right ridge 57 are formed in the front, rear and right side, respectively, on the upper side of the side tilting base 16, and an area encompassed by these three ridges defines an attachment recess 58. The inner side of the ridge 57 facing the attachment recess 58 forms an inclined surface 57a which slopes outwardly to undercut the top of the ridge inwardly into the recess 58. A generally semi-circular extension 16a protrudes from the left side of the side tilting base 16, underneath which a coupler portion 59 extends downwardly so as to loosely mate into the recess 41b in the tilting base 14 as suggested in phantom lining in FIG. 1. An internally threaded screw hole 59a passes through the center of the coupler portion 59. A locking lever 61 is mounted on the upper end of the coupler portion 59 of the side tilting base 16 and turns about a screw 60 threaded into the screw hole 59a. As shown in FIG. 5, this locking lever 61 includes a generally disc shaped cam 64 and an actuating lever 65 which extends radially from the cam 64. A flat surface 64a is formed on one side of the cam 64, and an inclined surface 66 is also formed along the perimeter of the cam in such a way that the diameter of the cam tapers from top to bottom. Cam 64 is mounted eccentrically by screw 60, so that the distance from the cam axis to the peripheral inclined surface 66 increases as the distance from the flat surface 64a becomes greater. The locking lever 61 is tensioned in a clockwise direction (as seen in top view) by torsion spring 68.

A generally rectangular attachment base 71 fits snugly into the attachment recess 58 in the top side of the side tilting base 16. Attachment base 71 is of the so called "quick-shoe" type, and a fastening screw 72 is provided to retain a camera mounted to the base 71 for easy removal and attachment to the panhead. An indexing pin 73 on the base 71 is movable up and down but spring loaded in an upward direction. The fastening screw is turned by means of a knob underneath the base (not shown in the drawings). On the left and right sides of the attachment base 71 are inclined surfaces 75, 76 which taper in height toward their outer edges.

A 35 mm camera, for example, can be mounted to the panhead 10 by first threading the fastening screw 72, while the attachment base 71 is separated from the side tilting base 16, into the bottom of the 35 millimeter camera to secure the camera to the attachment base 71. Then, with the flat surface 64a of the locking lever 61 of the side tilting base 16 facing toward the attachment recess 58, the attachment base 71 while still secured to the camera is placed into the attachment recess 58. With the inclined surface 76 on the right side of the attachment base 71 fitted against the inclined surface 57a of the right ridge 57 of the side tilting base 16, the 35 mm camera can then be secured to the panhead via the attachment base 71 by turning the locking lever 61 so that the inclined surface 75 of the left side is pressed against the inclined surface 66 of the cam 64 of the locking lever 61. A video camera or the like mounted in this manner it can be easily positioned by fitting the indexing pin 73 to the mating hole provided on the bottom of the video camera. By turning the pan locking screw 38 and the handle H to loosen them and then manually operating the handle, the lens of a 35 millimeter camera supported on the panhead can be oriented towards a photographic subject.

In order to support the camera vertically for portrait mode photography, the side tilt locking screw 53 is turned and loosened, and the side tilting base 16 is swung from its horizontal position indicated in phantom lining in FIG. 1 towards the upper right until it is vertical, and the side tilt locking screw 53 is then tightened for locking the side tilting base 16 in the vertical position.

As the tilting base 14 is extended towards the right and the side tilting base 16 turns upright about an axis located at the right edge of the tilting base 14, the control handle H will be positioned to the left of the 35 mm camera, even after the side tilting base 16 is swung up with and the 35 mm camera to its vertical position. Therefore, under these conditions the 35 mm camera can still be operated with the right hand and the handle H can be operated with the left hand, which results in a considerable improvement in the convenience of operation of the panhead 10.

Many currently available single lens reflex cameras have a hand grip provided on the operator's right side of the camera body. However, the surfaces of other portions of the camera body are not covered with textured leather and it is not easy for this reason to hold the left side of the camera body with the left hand. However, with the panhead of this invention, a camera can be easily mounted to the panhead while holding the camera with the right hand.

In conventional panheads, particularly when a single lens reflex camera or the like is mounted on a conventional side tilting base with its axis on the left side of the panhead, as the side tilting base is turned to the left in order to take photographs vertically, the downward direction towards which the lens (and the camera) tends to tilt under its own weight is the same direction in which the camera-fastening screw turns to become loosened. Thus, when a heavy interchangeable lens of 200 mm or 300 mm in focal length is attached to the front of the camera, there is a possibility that the camera might turn downwards because of the weight of the lens. With the panhead of this invention however, since the side tilting base turns to the right, the direction to which the lens tends to tilt down is the direction in which the camera fastening screw 72 is turned for tightening, and consequently undesirable movement of the camera is prevented.

Also, when the flash head of an electronic flash is mounted to the upper left of the camera body in today's compact cameras, when the camera is turned onto its left side in prior art panheads, the flash head becomes located below the lens, and the subject illuminated from below so that a good lighting effect becomes difficult to obtain. With the improved panhead of this invention, on the other hand, the flash head becomes positioned above the lens, even when taking photographs vertically with a camera that has the flash head installed on the upper left of the camera body, and a good lighting effect can be obtained.

Figure 6:
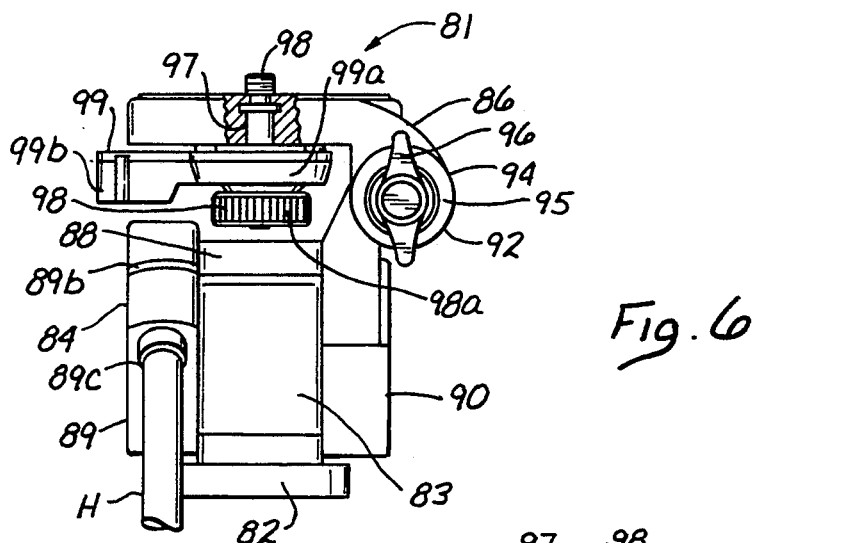
FIG. 6 is a rear partially broken away view of a second embodiment of the improved panhead.
Figure 7:
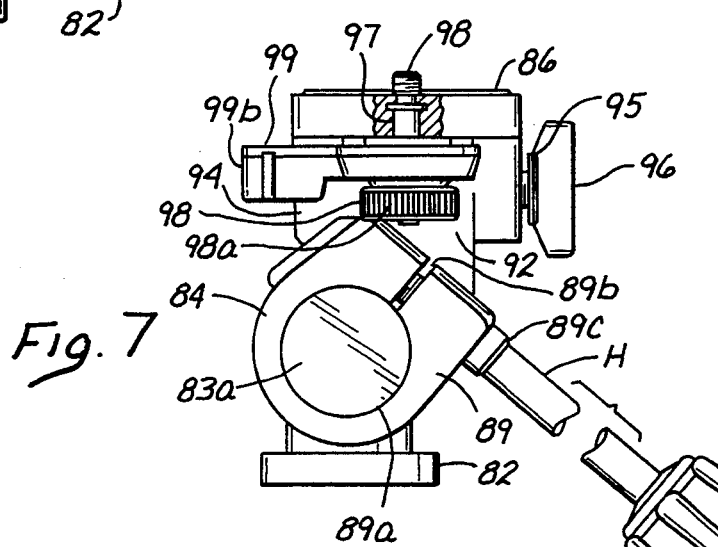
FIG. 7 is a partially broken away left side view of the panhead of FIG. 6.
Figure 8:
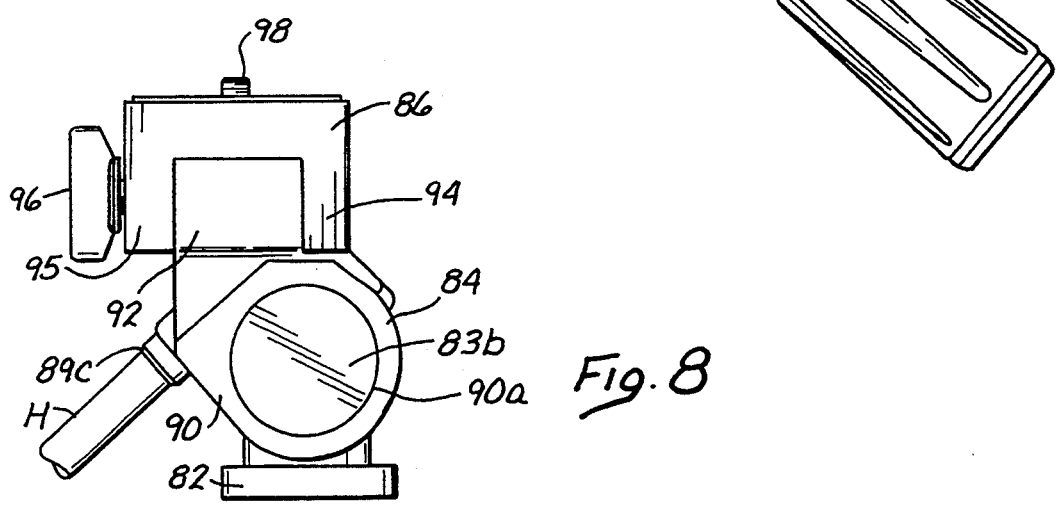
FIG. 8 is a right side view of the panhead of FIG. 6.

Turning now to FIGS. 6–8, alternate embodiments of the improved panhead according to this invention will be described. The improved panhead generally designated by numeral 81 has a base unit 82 which attaches to the fastening screw of a tripod or the like (not shown in the drawings); a panning base 83 axially mounted for rotation to the base unit 82 about a vertical axis; a tilting base 84, which tilts around a first horizontal axis which extends from left to right of the operator; and a moveable side tilting base 86 which is axially held to the tilting base 84 about a second horizontal axis transverse to the first horizontal axis. The base unit 82, which is of generally cylindrical form, has a screw hole (not shown in the drawings) axially centered in its underside for receiving the attachment screw of a tripod. The panning base 83 is adapted to turn smoothly over the top of the base unit 82, so that it can turn freely horizontally. Generally cylindrical shafts 83a and 83b extend coaxially from the left and right side respectively of the panning base 83. The rotatable shaft 83b on the right side of the operator has a slightly larger diameter than the shaft 83a on the left side. The tilting base 84 includes an upper plate section 88 and both a left plate section 89 and a right plate section 90, which extend downwardly from the left and right sides respectively of the upper plate section 88 in a generally U-shaped form. A hole 89a and a slot 89b, which runs radially to the hole 89a in an upward and rearward direction, are defined in the left plate section 89. A screw hole 89c opens rearwardly and downwardly into the side of the generally C-shaped left plate section 89. The shaft 83a of the panning base 83 is snugly fitted into the hole 89a, and a rod shaped handle H is screwed into the hole 89c. A hole 90a is formed in the right side plate 90 concentrically with the hole 89a of the left side plate 89, and shaft 83b is inserted into hole 90a snugly so that tilting base 84 can tilt up/down about the first horizontal axis defined by the shafts 83a and 83b. Panning base 83 and tilting base 84 can be turned by means of operating handle H, and the handle is adapted to either lock together the panning base 83 and the tilting base 84, or to vary their relative sliding resistance by turning the grip of the handle. A generally cylindrical bearing 92, which has a through hole drilled through its center and can turn on a front-to-back axis is formed on the upper right side of the tilting base 84. Side tilting base 86, mounted on top of the tilting base 84, is generally rectangular and a front bearing 94 and a rear bearing 95 extend downwardly from its front and rear edges on the right side of the base 86, and turn freely against the front and rear edges of the bearing 92 of the tilting base 84 as best seen in FIG. 8. Through-holes with the through-hole of bearing 92 extend through the front and rear bearings 94 and 95, and side tilt locking screw 96 is installed through these holes so that the side tilting base 86, installed over the tilting base 84, can be tilted about the second horizontal axis defined by the side tilt locking screw 96. By turning the locking screw 96, bearing 92 of the tilting base 84 and the front and rear bearings 94, 95 of the side tilting base 86 can be locked against relative movement, or their relative rotating contact resistance may be varied.

A through-hole 97 in the center of the side tilting base 86 admits a fastening screw 98 for retaining a camera to the base 86. A circular knob 98a is fixed to the lower end of the screw 98, and a locking lever 99 is mounted for rotation about the screw 98 between the knob 98a and the side tilting base 86. The locking lever 99 consists of a disc-shaped cam 99a and an actuating lever 99b which extends outwardly from the perimeter of the cam 99a. The screw 98 can be pushed up and tightened by turning this locking lever 99.

The front lens of the camera can be readily directed towards the subject by manually operating the loosened handle H of the panhead 81. In order to hold the camera vertically for "portrait" mode photography, the side tilting base 86 is turned upright, towards the upper right of the panhead by rotation from its horizontal position to a vertical position after the side tilt locking screw 96 has been turned to loosen it, and the side tilting base 86 may then be locked by again turning the side tilt locking screw 96 to tighten it.

In this second embodiment of the improved panhead according to this invention, the side tilting base 86 turns towards the upper right about an axis at the right side of the tilting base 84, so that handle H is situated on the left of the 35 mm camera even if the camera is supported vertically. It is thus possible to operate the 35 mm camera with the right hand and the handle H with the left hand, greatly improving the convenience of operation of the panhead 81.

While particular embodiments of the invention have been described and illustrated for purposes of clarity and example, it must be understood that many changes, substitutions and modifications to the described embodiments will become readily apparent to those possessed of ordinary skill in the art without thereby departing from the scope and spirit of the present invention which is defined by the following claims.

What is claimed is:

1. A panhead for a tripod of the type used for supporting a camera, said panhead comprising:
    a panning base adapted for mounting to a tripod for rotation in a horizontal plane about a vertical axis;
    a tilting base hinged to said panning base for turning about a first horizontal axis, said tilting base having left and right sides, a front and a rear;
    a side tilting base including a top surface and hinged to said tilting base for turning about a second horizontal axis transverse to said first horizontal axis between a horizontal position and a vertical position, and means for mounting a camera to said top surface; and
    an operating handle extending rearwardly from said left side of said tilting base;
    characterized in that said second horizontal axis is located on said right side of said tilting base and generally diametrically opposed to said handle about said vertical axis, such that said side tilting base pivots clockwise and towards the right of an operator facing said rear as said side tilting base is turned from said horizontal to said vertical position.

2. A panhead for a tripod of the type used for supporting a camera, said panhead comprising:
    a panning base rotatable about a vertical axis;
    a tilting base hinged to said panning base about a first horizontal axis normal to said vertical axis and an operating handle attached to said tilting base;
    a side tilting base hinged to said tilting base for turning between a horizontal position and a vertical position about a second horizontal axis normal to both said first horizontal axis and said vertical axis, and means for mounting a camera to said side tilting base;
    characterized in that said mounting means lies between said handle and said second horizontal axis in a horizontal position of said side tilting base.

3. The panhead of claim 2 wherein said mounting means is a screw axially aligned with said vertical axis in said horizontal position of said side tilting base.

4. The panhead of claim 2 wherein said handle extends parallel to said second horizontal axis in a top plan view of said panhead.

5. A panhead for a tripod of the type used for supporting a camera, said panhead comprising:
    a panning base rotatable about a vertical axis;
    a tilting base hinged to said panning base about a first horizontal axis normal to said vertical axis, said tilting base having a left side and a right side, and an operating handle attached to one of said left and said right sides;
    a side tilting base including a top surface and hinged to said tilting base for turning between a horizontal position and a vertical position about a second horizontal axis normal to both said first horizontal axis and said vertical axis, and camera mounting means on said top surface;
    characterized in that said camera mounting means move towards the other of said left and said right sides as said side tilting base moves from said horizontal position towards said vertical position.

6. A panhead for a tripod of the type used for supporting a camera, said panhead comprising:
    a panning base rotatable about a vertical axis;
    a tilting base hinged to said panning base about a first horizontal axis normal to said vertical axis;
    a side tilting base including a top surface and hinged to said tilting base for turning between a horizontal position and a vertical position about a second horizontal axis normal to both said first horizontal axis and said vertical axis, and camera mounting means on said top surface;
    an operating handle attached to said tilting base on one side of said second horizontal axis;
    characterized in that said camera mounting means moves towards the other side of said second horizontal axis as said side tilting base moves from said horizontal position towards said vertical position.

7. The panhead of claim 6 wherein said mounting means is a screw axially aligned with said vertical axis in said horizontal position of said side tilting base.

8. The panhead of claim 6 wherein said mounting means lies between said handle and said second horizontal axis in said horizontal position of said side tilting base.

* * * * *